US010969087B1

(12) United States Patent
Jiang (10) Patent No.: US 10,969,087 B1
(45) Date of Patent: Apr. 6, 2021

(54) STAGE LIGHT HAVING UNLOCKABLE BRAKE MOTOR

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 0 days.

(21) Appl. No.: 16/738,409

(22) Filed: Jan. 9, 2020

Related U.S. Application Data

(63) Continuation of application No. PCT/CN2019/127189, filed on Dec. 20, 2019.

(30) Foreign Application Priority Data

Oct. 31, 2019 (CN) .......................... 201921860893.1

(51) Int. Cl.
*F21V 21/15* (2006.01)
*H05B 47/175* (2020.01)
*H02M 3/158* (2006.01)
*F21V 21/06* (2006.01)
*F21W 131/406* (2006.01)

(52) U.S. Cl.
CPC .............. *F21V 21/15* (2013.01); *F21V 21/06* (2013.01); *H02M 3/1582* (2013.01); *H05B 47/175* (2020.01); *F21W 2131/406* (2013.01)

(58) Field of Classification Search
CPC ...... F21V 21/06; F21V 21/15; H02M 3/1582; H05B 47/175
See application file for complete search history.

(56) References Cited

U.S. PATENT DOCUMENTS 3,644,728 A * 2/1972 Hessemer ............... B60Q 1/076
362/212
5,882,107 A * 3/1999 Bornhorst ............... F21S 10/02
362/281

(Continued)

FOREIGN PATENT DOCUMENTS

CN 204437787 U 7/2015
CN 205480566 U 8/2016
(Continued)

OTHER PUBLICATIONS

International Search Report for PCT/CN2019/127189 dated Oct. 31, 2019; 5 pages.

(Continued)

*Primary Examiner* — Zheng Song
(74) *Attorney, Agent, or Firm* — Lerner, David, Littenberg, Krumholz & Mentlik, LLP (57) ABSTRACT

The present invention discloses a stage light having an unlockable brake motor, comprising a controlled component, and a braking motor that drives the controlled component to move, wherein the braking motor comprises a motor unit and a braking unit for braking the motor unit, and the braking motor is a power-off locking motor; and further comprising a controller, an auxiliary power source that supplies backup power to the braking unit, and an input unit that controls on and off of the auxiliary power source, wherein the motor unit and the braking unit are connected in parallel with each other and are both electrically connected to the controller.

11 Claims, 6 Drawing Sheets

(56) References Cited

U.S. PATENT DOCUMENTS

| | | | | |
|---|---|---|---|---|
| 6,605,907 | B2* | 8/2003 | Belliveau | H05B 47/155 |
| | | | | 315/294 |
| 6,866,402 | B2* | 3/2005 | Belliveau | F21V 21/15 |
| | | | | 362/272 |
| 8,201,974 | B1* | 6/2012 | Smith | F21V 29/763 |
| | | | | 362/257 |
| 2007/0145937 | A1 | 6/2007 | Hansen | |
| 2009/0080204 | A1* | 3/2009 | Puglisi | F21S 8/024 |
| | | | | 362/371 |
| 2009/0323363 | A1 | 12/2009 | Evans | |
| 2013/0120984 | A1* | 5/2013 | Hinrichs | F21V 21/14 |
| | | | | 362/235 |
| 2014/0009949 | A1* | 1/2014 | Evans | F21V 21/06 |
| | | | | 362/386 |

FOREIGN PATENT DOCUMENTS

| | | |
|---|---|---|
| CN | 207262284 U | 4/2018 |
| CN | 110336491 A | 10/2019 |
| EP | 1001212 A2 | 5/2000 |
| EP | 2469157 A1 | 6/2012 |
| EP | 3136590 A1 | 3/2017 |
| IT | 201700007894 A1 | 7/2018 |
| KR | 101968199 B1 | 4/2019 |

OTHER PUBLICATIONS

Extended European Search Report including Written Opinion for EP192201143 dated Jul. 24, 2020; 9 pages.

* cited by examiner

STAGE LIGHT HAVING UNLOCKABLE BRAKE MOTOR

CROSS REFERENCE TO RELATED APPLICATIONS

The present application is a continuation of International Application No. PCT/CN2019/127189, filed Dec. 20, 2019, which claims priority from Chinese Patent Application No. 201921860893.1 filed Oct. 31, 2019, all of which are hereby incorporated herein by reference.

TECHNICAL FIELD

The present invention relates to the technical field of stage lights, and more particularly to a stage light having an unlockable brake motor.

BACKGROUND ART

With the development of the stage light technologies, the running speed of a controlled component of a stage light is getting faster, so that light beam scanning or the switching of light effects are becoming faster, for example, rotation of a light holder, and a focus lens, magnifying lens, cutter, etc. inside the light holder.

In an actual use process, a non-standard operation by an operator or sudden power failures, etc. would sometimes cause a stage light to be suddenly powered off, and thus, the controlled component falls down under the action of gravity, causing the controlled component to be damaged due to collision. Brake motors will be used in some stage lights for automatic locking after the power off, so that the controlled component is kept in an original position to prevent the controlled component from falling down; however, next time before the stage light is powered on, the controlled component is always in a locked state and cannot rotate or move, for example, since light holders or support arms of stage lights are locked due to power-off, the stage lights cannot recover to a regular shape and thus be stored, the stage lights need to be carried or wires need to be pulled, and each stage light needs to be plugged in again before packing, so as to enable the light holders or the support arms to be reset, which is very complicated and has a low packing efficiency.

SUMMARY

In order to overcome at least one of the above-mentioned defects described in the prior art, the present invention provides a stage light having an unlockable brake motor, which may enable a controlled component of the stage light to be manually reset without an external power source, and facilitate packing.

In order to solve the above-mentioned technical problems, the technical solution used in the present invention is as follows: a stage light having an unlockable brake motor, comprising a controlled component, and a braking motor that drives the controlled component to move, wherein the braking motor comprises a motor unit and a braking unit for braking the motor unit, and the braking motor is a power-off locking motor; and further comprising a controller, an auxiliary power source that supplies backup power to the braking unit, and an input unit that controls on and off of the auxiliary power source, wherein the motor unit and the braking unit are connected in parallel with each other and are both electrically connected to the controller.

By arranging the braking motor having the braking unit, the stage light having the unlockable brake motor locks the motor unit after the stage light is powered off, so that the controlled component is kept in an original position, thereby preventing the controlled component from falling down and being damaged; and after the stage light is detached, the auxiliary power source may be controlled by means of the input unit to power the braking unit, thereby implementing the unlocking of the controlled component, so that an operator may manually move or rotate the controlled component to an ideal position; and after the controlled component is moved to the ideal position, the auxiliary power source is controlled by means of the input unit again to power off the braking unit, so that the controlled component is automatically locked. In this way, for both the packing of the stage light and maintenance due to power-off, the controlled component may be freely moved or rotated, which is very convenient.

Further, the braking unit drives the controlled component to rotate around a pivot shaft.

Further, the controlled component is a light holder or a support arm of the light holder.

Further, the input unit is a button, and the auxiliary power source is turned on when the button is pressed and the auxiliary power source is turned off when the button is released; or the input unit is a button, and the auxiliary power source is turned on when the button is pressed for the first time, and the auxiliary power source is turned off when the button is released after being pressed again. This operation is simple and it is convenient to control on and off of the auxiliary power source, and the input unit may even be found by touch, which is very fast.

Further, the input unit is a touch-control screen, and the touch-control screen is powered by the auxiliary power source. After the stage light is powered off, the auxiliary power source automatically supplies power to the touch-control screen, and the touch-control screen is used to control the auxiliary power source to turn on or turn off circuits other than the touch-control screen, which may be implemented by directly using an existing control screen on the stage light without a need to additionally arrange a control switch, and has a low cost.

Further, the input unit and the auxiliary power source are both electrically connected to the controller, and the controller receives a control signal from the input unit to control on and off of the auxiliary power source. That is, instead of directly controlling on and off of the auxiliary power source, the input unit indirectly controls the on and off of the auxiliary power source by sending a signal to the controller, which is safer.

Further, the braking unit is of a magnetic attraction type. In the case of power-on, an electromagnetic coil is used to attract a permanent magnet, so that the motor unit is in an unlocked state, and in the case of power-off, the electromagnetic coil releases the permanent magnet automatically, and the permanent magnet attracts a braking disc, so as to lock the motor unit.

Further, the braking unit is located on one side of the motor unit or is arranged around the motor unit in a direction perpendicular to a rotating shaft of the motor unit. The length of the braking motor in a direction of the rotating shaft is reduced, so as to facilitate reasonable use of the space in the stage light.

Further, when detecting that the motor unit is powered on, the controller controls the power supply of the braking unit to be switched from the auxiliary power source to the mains electricity, and the auxiliary power source is charged.

Further, when detecting that the motor unit is powered on, the controller controls the motor unit to provide a holding torque, and controls the braking unit to be powered on to release a locked state. Since the motor unit would provide the holding torque, when the braking unit is powered on to release the locked state, the controlled component would be kept in the original position and does not move, which may effectively avoid a problem of the controlled component dropping after the stage light is powered on.

Further, a boost circuit is arranged between the auxiliary power source and the braking unit. The boost circuit may boost the voltage of the auxiliary power source to a voltage value required by the braking unit.

DETAILED DESCRIPTION OF EMBODIMENTS

The accompanying drawings are merely for exemplary illustration and are not to be construed as limiting the present invention. For better illustration of the embodiments, some components in the accompanying drawings may be omitted, scaled up, or scaled down, which does not represent a size of an actual product. It may be understood by a person skilled in the art that some well-known structures and illustration thereof may be omitted in the accompanying drawings. The illustration about location relationships in the accompanying drawings are merely for exemplary illustration and are not to be construed as limiting the present invention.

Figure 1:
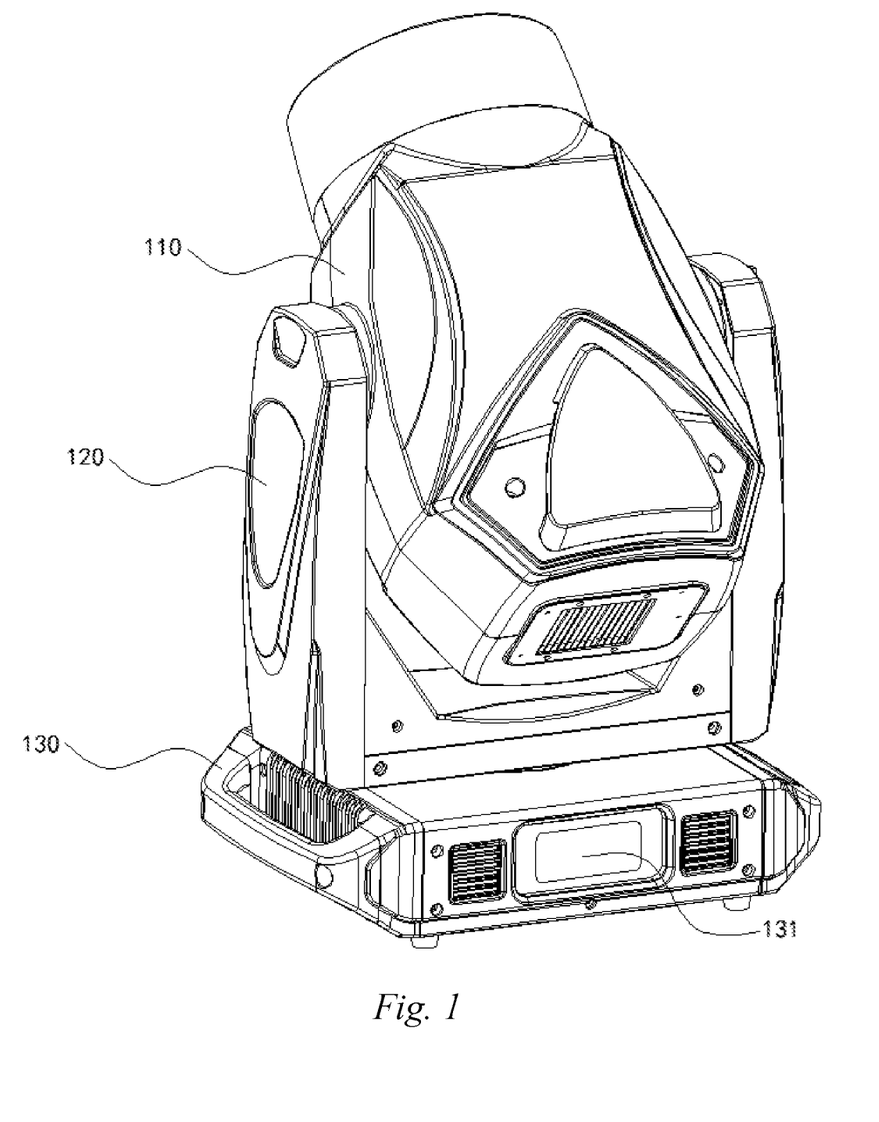
FIG. 1 is a schematic diagram of an overall structure of a stage light of the present invention.
Figure 2:
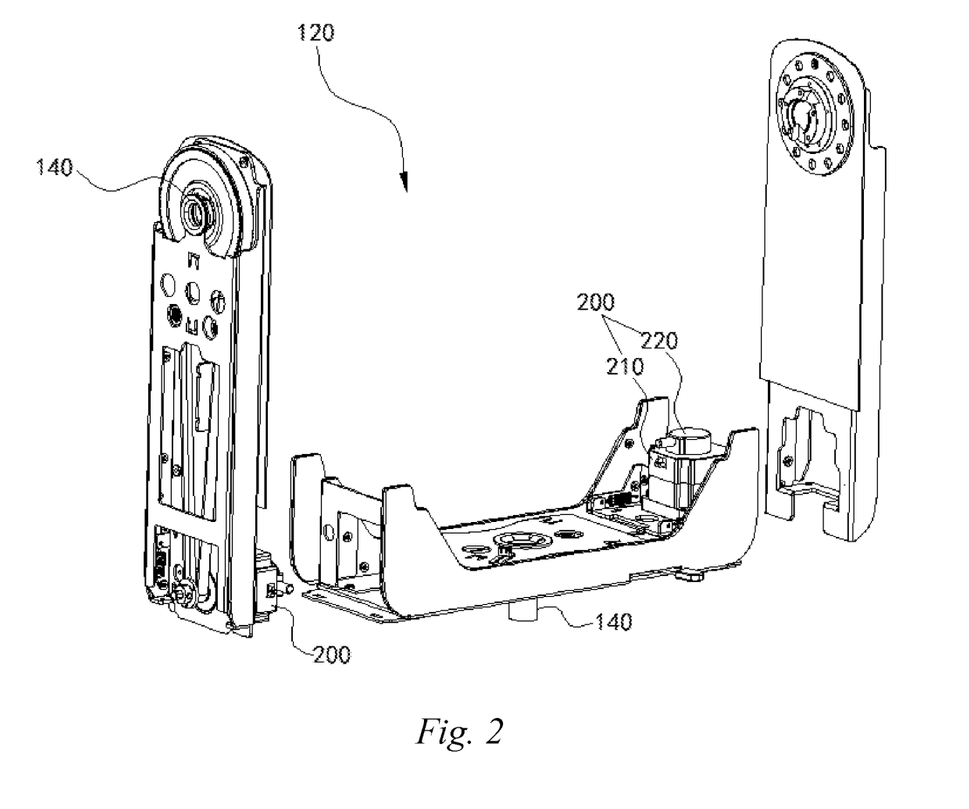
FIG. 2 is a schematic diagram of an internal structure of a support arm of the present invention.
Figure 3:
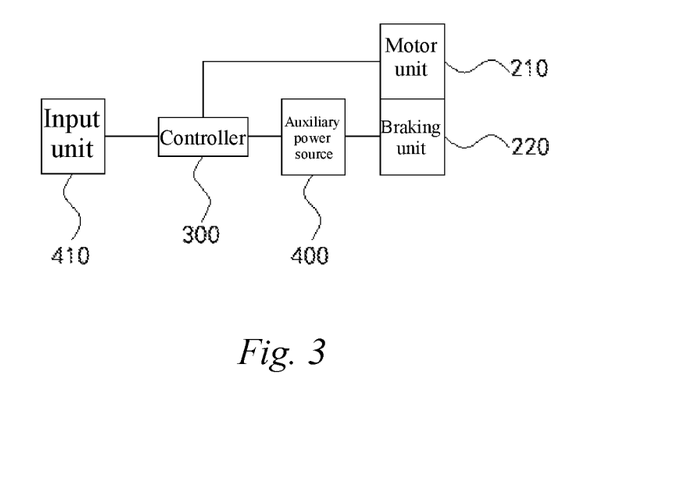
FIG. 3 is a schematic diagram of a control principle of a braking motor of the present invention.

As shown in FIGS. 1 to 3, the present embodiment provides a stage light having an unlockable brake motor, comprising a controlled component, and a braking motor 200 that drives the controlled component to move, wherein the braking motor 200 comprises a motor unit 210 and a braking unit 220 for braking the motor unit 210, and the braking motor 200 is a power-off locking motor; and further comprising a controller 300, an auxiliary power source 400 that supplies backup power to the braking unit 220, and an input unit 410 that controls on and off of the auxiliary power source 400, wherein the motor unit 210 and the braking unit 220 are connected in parallel with each other and are both electrically connected to the controller 300.

By arranging the braking motor 200 having the braking unit 220, the above-mentioned stage light having the unlockable brake motor locks the motor unit 210 after the stage light is powered off, so that the controlled component is kept in an original position, thereby preventing the controlled component from falling down and being damaged; and after the stage light is detached, the auxiliary power source 400 may be controlled by means of the input unit 410 to power the braking unit 220, thereby implementing the unlocking of the controlled component, so that an operator may manually move or rotate the controlled component to an ideal position; and after the controlled component is moved to the ideal position, the auxiliary power source 400 is controlled by means of the input unit 410 again to power off the braking unit 220, so that the controlled component is automatically locked. In this way, for both the packing of the stage light and maintenance due to power-off, the controlled component may be freely moved or rotated, which is very convenient. A rotating shaft of a motor remains stationary, and the motor provides a holding torque to withstand the gravity of the controlled component, which is well known to a person skilled in the art. For example, in a process in which the stage light works normally, a focus lens and a magnifying lens are driven by the motor to specific positions, and then the holding torque provided by the motor is used to keep the focus lens and the magnifying lens in the specific positions, which are techniques frequently used by a person skilled in the art at present, and will not be redundantly described herein.

In a preferred embodiment of the present invention, the braking unit 220 drives the controlled component to rotate around a pivot shaft 140. Preferably, the braking motor 200 drives the controlled component to rotate by means of a synchronous belt, which is advantageous in reasonable arrangement of space.

In a preferred embodiment of the present invention, the controlled component is a light holder 110 or a support arm 120 of the light holder 110. The braking motor 200 drives the light holder 110 to enable light beams emitted by the light holder 110 to project towards different directions. In this embodiment, the light holder 110 is pivotally connected to the support arm 120, the support arm 120 is pivotally connected to the chassis 130, a pivot shaft 140 between the light holder 110 and the support arm 120 and a pivot shaft 140 between the support arm 120 and the chassis 130 are perpendicular to each other, and the light holder 110 and the support arm 120 are driven by one of the braking motors 200, respectively.

In this embodiment, the controller 300 and the auxiliary power source 400 are both arranged in the chassis 130, the input unit 410 is located on the housing of the chassis 130, and in other embodiments, the input unit 410 may also be located on the support arm 120 or the light holder 110.

In a preferred embodiment of the present invention, the input unit 410 is a button, and the auxiliary power source 400 is turned on when the button is pressed and the auxiliary power source 400 is turned off when the button is released; or the input unit 410 is a button, and the auxiliary power source 400 is turned on when the button is pressed for the first time, and the auxiliary power source 400 is turned off when the button is released after being pressed again. This operation is simple and it is convenient to control on and off of the auxiliary power source 400, and the input unit 410 may even be found by touch, which is very fast.

In a preferred embodiment of the present invention, the input unit 410 is a touch-control screen, and the touch-control screen is powered by the auxiliary power source 400. After the stage light is powered off, the auxiliary power source 400 automatically supplies power to the touch-control screen, and the touch-control screen is used to control the auxiliary power source 400 to turn on or turn off circuits other than the touch-control screen, which may be implemented by directly using an existing control screen 131 on the stage light without a need to additionally arrange a control switch, and has a low cost.

In a preferred embodiment of the present invention, the input unit 410 and the auxiliary power source 400 are both electrically connected to the controller 300, and the controller 300 receives a control signal from the input unit 410 to control on and off of the auxiliary power source 400. That is, instead of directly controlling on and off of the auxiliary power source 400, the input unit 410 indirectly controls the on and off of the auxiliary power source by sending a signal to the controller 300, which is safer, and after the stage light is powered off, the controller 300 is also powered by the auxiliary power source 400.

In a preferred embodiment of the present invention, the braking unit 220 is of a magnetic attraction type. In the case of power-on, an electromagnetic coil is used to attract a permanent magnet, so that the motor unit 210 is in an unlocked state, and in the case of power-off, the electromagnetic coil releases the permanent magnet automatically, and the permanent magnet attracts a braking disc, so as to lock the motor unit 210. Because the magnetic attraction type braking motor 200 is a conventional element that can be purchased on the market at will, which will not be redundantly described herein.

Figure 4:
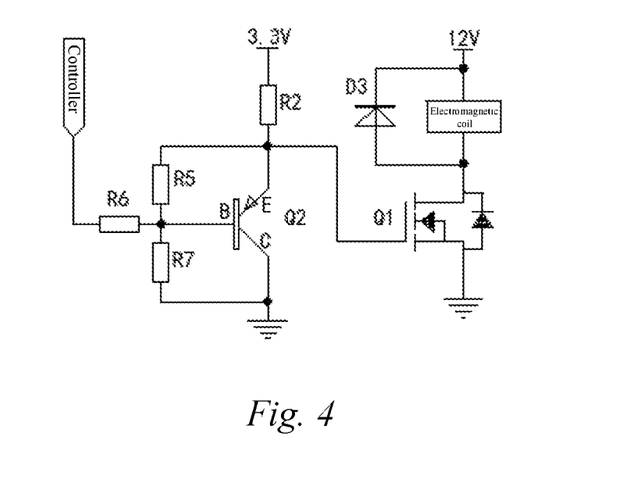
FIG. 4 is a schematic structural diagram of a brake control circuit of the present invention.

As shown in FIG. 4, which is a schematic structural diagram of a brake control circuit of the present invention, an R2, R6, and R7 are of 1 KΩ, an R5 is of 10 KΩ, a D3 is of a model SK34A, a Q1 is of a model S12318CDS, and a Q2 is of a model 2SA1981S-Y.

In a preferred embodiment of the present invention, the braking unit 220 is located on one side of the motor unit 210 or is arranged around the motor unit 210 in a direction perpendicular to a rotating shaft of the motor unit 210. The length of the braking motor 200 in a direction of the rotating shaft is reduced, so as to facilitate reasonable use of the space in the stage light. When necessary, the braking unit 220 may be further arranged at one end of the motor unit 210 that is far away from the rotating shaft, to reduce the width of the braking motor 200.

In a preferred embodiment of the present invention, when detecting that the motor unit 210 is powered on, the controller 300 controls the power supply of the braking unit 220 to be switched from the auxiliary power source 400 to the mains electricity, and the auxiliary power source 400 is charged.

Figure 5:
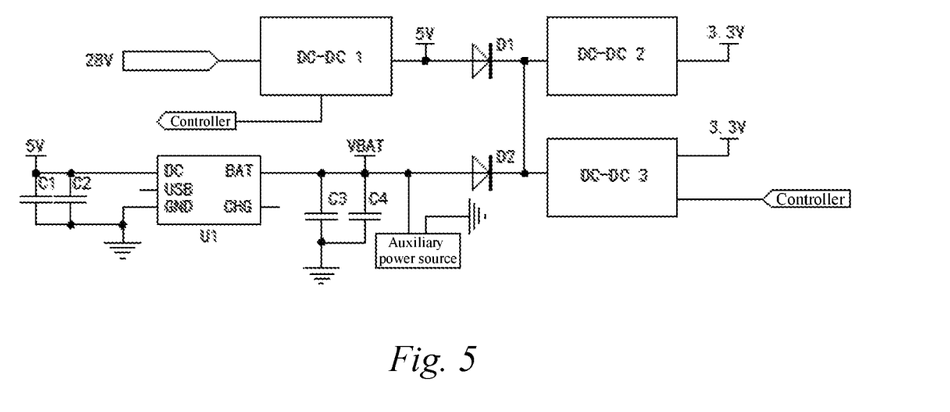
FIG. 5 is a schematic structural diagram of a battery charging and discharging control circuit of the present invention.

As shown in FIG. 5, which is a schematic structural diagram of a battery charging and discharging control circuit of the present invention, in the figure, a C1 and a C3 are of 1 µF, a C2 and a C4 are of 0.1 µF, a D1 and a D2 are of a model SK34A, a DC-DC1 converts 28 V into 5 V, a DC-DC2 converts 5 V into 3.3 V, a DC-DC3 converts 5 V into 3.3 V, a U1 is of a model MAX1555EZK-T, and the controller 300 is connected to the DC-DC1 to perform incoming power detection.

In a preferred embodiment of the present invention, when detecting that the motor unit 210 is powered on, the controller 300 controls the motor unit 210 to provide a holding torque, and controls the braking unit 220 to be powered on to release a locked state. Since the motor unit 210 would provide the holding torque, when the braking unit 220 is powered on to release the locked state, the controlled component would be kept in the original position and does not move, which may effectively avoid a problem of the controlled component dropping after the stage light is powered on.

In a preferred embodiment of the present invention, a boost circuit is arranged between the auxiliary power source 400 and the braking unit 220. The boost circuit may boost the voltage of the auxiliary power source 400 to a voltage value required by the braking unit 220.

Figure 6:
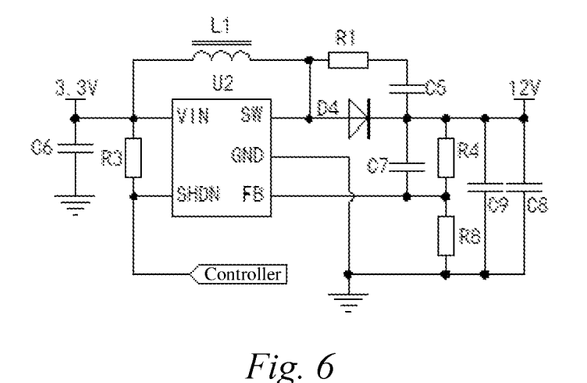
FIG. 6 is a schematic structural diagram of a boost circuit of the present invention.

As shown in FIG. 6, which is a schematic structural diagram of a boost circuit of the present invention, in the figure, an R1 is of 10Ω, an R3 is of 47 KΩ, an R4 is of 62 KΩ, an R8 is of 6.8 KΩ, a C5 is of 1 nF, a C6 is of 10 µF, a C7 is of 220 pF, a C8 is of 0.1 µF, a C9 is of 10 µF, an L1 is of 10 µH, a D4 is of a model SS14, and a U2 is of a model LMR 62014.

When the stage light is powered off, the battery performs discharging with a voltage being VBAT (such as 3.7 V), which is input into the DC-DC2 through the D2 for voltage step-down, and then a voltage of 3.3 V is output for use by the controller 300. When the controller 300 detects that the DC-DC1 outputs a low level, it is determined that the mains electricity is cut off, and then the controller outputs a low level to control the DC-DC3 to be turned off; and at this point, there is no output of 3.3 V, the boost circuit and the brake control circuit lose power and do not work, so that a sleep power-saving mode is entered. The electromagnetic coil loses power, and a magnetic force, and a permanent magnet attracts a braking disc, to implement brake locking.

When brake locking needs to be temporarily released, a temporary power-on signal is input by means of the input unit 410, and then the standby controller 300 detects the temporary power-on signal, and it is determined that the braking is manually released temporarily; the controller outputs a high level to control the DC-DC3 to work so as to step down a battery discharging voltage VBAT to 3.3 V, and the controller 300 sends a low level signal to control the U2 to work; and at this point, the brake control circuit also works, the electromagnetic coil is energized to produce a magnetic force, so that the braking disc is pulled out to release the brake locking. When a power-off signal is input by means of the input unit 410, it is determined that temporary releasing of braking locking is completed, so that the previously-mentioned sleep power-saving mode is entered.

When the stage light is powered on, a voltage of 28 V is input into the DC-DC1 for voltage step-down and a voltage of 5 V is output, which flows through the D1 and is then stepped down by the DC-DC2, and then a voltage of 3.3 V is output for use by the controller 300. When the controller 300 detects that the DC-DC1 outputs a high level, it is determined that the mains electricity is supplied, and after controlling and waiting for the motor to provide a holding torque, the controller outputs a high level instruction to control the DC-DC3 to work and output a voltage of 3.3 V for use by the boost circuit; and the controller 300 outputs a low level signal to the U2 to control the U2 to work, and a voltage of 12 V, for use by the brake control circuit, is output after voltage step-up. The brake control circuit is energized with 12 V and 3.3 V, and detects the low level output by the controller 300, the Q1 is conducted, and the electromagnetic coil is energized to produce a magnetic force and the permanent magnet is pulled out, so that the braking disc is released and release the brake locking. The DC-DC1 outputs 5 V, and the U1 converts 5 V into the voltage VBAT (such as 4.2 V), to charge the battery.

Obviously, the above-mentioned embodiments of the present invention are merely examples made for clearly describing the present invention, but do not limit implementations of the present invention. For a person of ordinary skill in the art, other forms of changes or variations may also be made on the basis of the above-mentioned illustration. There is no need and no way to exhaust all implementations here. Within the spirit and principle of the present invention, any modifications, equivalent replacements, improvements, etc., shall be comprised within the scope of protection of the present invention.

The invention claimed is:

1. A stage light having an unlockable brake motor, comprising
    a controlled component;
    and a braking motor that drives the controlled component to move,
    wherein the braking motor comprises
        a motor unit; and
        a braking unit for braking the motor unit, and the braking motor being a power-off locking motor; and further comprising
        a controller;
    an auxiliary power source that supplies backup power to the braking unit; and
    an input unit that controls the auxiliary power source on and off,
        wherein the motor unit and the braking unit are connected in parallel with each other and are both electrically connected to the controller, and
        wherein the auxiliary power source is capable to power the braking unit by the input unit to achieve an unlocking of the controlled component, and further to power off the braking unit by the input unit to recover locking of the controlled component.

2. The stage light having the unlockable brake motor according to claim 1, wherein the braking unit drives the controlled component to rotate around a pivot shaft.

3. The stage light having the unlockable brake motor according to claim 1, wherein the controlled component is a light holder or a support arm of the light holder.

4. The stage light having the unlockable brake motor according to claim 1, wherein the input unit is a button, and the auxiliary power source is turned on when the button is pressed and the auxiliary power source is turned off when the button is released; or the input unit is a button, and the auxiliary power source is turned on when the button is pressed for the first time and the auxiliary power source is turned off when the button is released after being pressed again.

5. The stage light having the unlockable brake motor according to claim 1, wherein the input unit is a touch-control screen, and the touch-control screen is powered by the auxiliary power source.

6. The stage light having the unlockable brake motor according to claim 1, wherein the input unit and the auxiliary power source are both electrically connected to the controller, and the controller receives a control signal from the input unit to control on and off of the auxiliary power source.

7. The stage light having the unlockable brake motor according to claim 1, wherein the braking unit is of a magnetic attraction type.

8. The stage light having the unlockable brake motor according to claim 1, wherein the braking unit is located on one side of the motor unit or is arranged around the motor unit in a direction perpendicular to a rotating shaft of the motor unit.

9. The stage light having the unlockable brake motor according to claim 1, wherein when detecting that the motor unit is powered on, the controller controls the power supply of the braking unit to be switched from the auxiliary power source to the mains electricity, and the auxiliary power source is charged.

10. The stage light having the unlockable brake motor according to claim 1, wherein when detecting that the motor unit is powered on, the controller controls the motor unit to provide a holding torque, and controls the braking unit to be powered on to release a locked state.

11. The stage light having the unlockable brake motor according to claim 1, wherein a boost circuit is arranged between the auxiliary power source and the braking unit.

* * * * *